United States Patent
Peña Muñoz et al.

(10) Patent No.: US 10,866,944 B2
(45) Date of Patent: Dec. 15, 2020

(54) RECONCILED DATA STORAGE SYSTEM

(71) Applicant: FUJITSU LIMITED, Kawasaki (JP)

(72) Inventors: Manuel Peña Muñoz, Seville (ES); José Mora López, Madrid (ES); Alejandro Llaves, Madrid (ES); Nuria Garcia Santa, Madrid (ES); Boris Villazón-Terrazas, Madrid (ES); Victor De La Torre, Madrid (ES)

(73) Assignee: FUJITSU LIMITED, Kawasaki (JP)

( * ) Notice: Subject to any disclaimer, the term of this patent is extended or adjusted under 35 U.S.C. 154(b) by 344 days.

(21) Appl. No.: 15/933,933

(22) Filed: Mar. 23, 2018

(65) Prior Publication Data
US 2018/0336235 A1    Nov. 22, 2018

(30) Foreign Application Priority Data
May 22, 2017    (EP) .................................... 17172285

(51) Int. Cl.
*G06F 16/23*    (2019.01)
*G06F 16/21*    (2019.01)
*G06F 16/903*    (2019.01)

(52) U.S. Cl.
CPC ........ *G06F 16/2329* (2019.01); *G06F 16/217* (2019.01); *G06F 16/219* (2019.01); *G06F 16/23* (2019.01); *G06F 16/903* (2019.01)

(58) Field of Classification Search
CPC .................................................. G06F 16/127
(Continued)

(56) References Cited

U.S. PATENT DOCUMENTS

2006/0247944 A1    11/2006    Calusinski, Jr. et al.
2007/0106771 A1    5/2007    Lucash et al.
(Continued)

FOREIGN PATENT DOCUMENTS

CN    104462568    3/2015
CN    104504128    4/2015
(Continued)

OTHER PUBLICATIONS

Extended European Search Report dated Nov. 30, 2017 in corresponding European Patent Application No. 17172285.3, 8 pages.
(Continued)

*Primary Examiner* — Baoquoc N To
(74) *Attorney, Agent, or Firm* — Staas & Halsey LLP

(57) ABSTRACT

An array of registered entity property-value pairs representing a registered entity are stored in a data storage system. Each of the pairs includes a property label representing a property and a value range of the property. For each identifier property-value, an identifier property label, uniquely identifying the registered entity, and an identifier value representing a value of the identifier property are stored. A dataset is acquired with dataset property-value pairs for each of a first set of acquired dataset entities, where each pair includes a property label representing a property and a value representing a value range of the property. An identifier property-value pair matching an acquired dataset property-value pair for the acquired dataset entity is identified and then the acquired dataset property-value pairs are consolidated into the array of registered entity property-value pairs.

10 Claims, 12 Drawing Sheets

(58) Field of Classification Search
USPC .................................................. 707/802, 808
See application file for complete search history.

(56) References Cited

U.S. PATENT DOCUMENTS

| | | | |
|---|---|---|---|
| 2013/0036119 A1* | 2/2013 | Yakout | G06F 16/24558 707/737 |
| 2014/0337331 A1 | 11/2014 | Hassanzadeh et al. | |
| 2015/0149420 A1 | 5/2015 | Lee | |
| 2016/0154847 A1 | 6/2016 | Prasanna Kumar et al. | |
| 2016/0292167 A1 | 10/2016 | Tran et al. | |
| 2017/0154057 A1* | 6/2017 | Wu | G06F 16/24 |
| 2018/0113888 A1 | 4/2018 | Peña Muñoz et al. | |
| 2018/0113926 A1 | 4/2018 | Llaves et al. | |

FOREIGN PATENT DOCUMENTS

| | | |
|---|---|---|
| CN | 105243528 | 1/2016 |
| CN | 105354236 | 2/2016 |
| DE | 102016220771.7 | 10/2016 |
| DE | 102016220781.4 | 10/2016 |
| EP | 3 023 886 | 5/2016 |
| GB | 2536898 | 10/2016 |
| JP | 2013-257874 | 12/2013 |
| TW | 200614017 | 5/2006 |
| WO | 2016/114736 | 7/2016 |

OTHER PUBLICATIONS

J.G. Enriquez et al., "Entity reconciliation in big data sources: A systematic mapping study", Expert Systems With Applications, Oxford, GB, vol. 80, Mar. 10, 2017, pp. 14-27**.

* cited by examiner

Input data

|   | Name | AddressLocality | Twitter |
|---|---|---|---|
| 1 | Sample Bank A | Madrid | @SampleBankA |
| 2 | Sample Bank B | Santander | @SampleBankB |
| 3 | Sample Bank C | Madrid | @SampleBankC |

Data Properties Reconciliation →

Annotated data

```
{   "path": "/data/shared-fs/../..csv",
    "dataset": "redis:test",
    "encoding": "utf-8",
    "jsonPath": "/data/shared-fs/../3b0ab...",
    "headers": [
                {"normalisedType": "name",
                 "type": "name",
                 "format": "string",
                 "dbpedia": "http://../../Name",
                 "wikidata": "Q82799",
                 "label_en": "name",
                 "label_es": "nombre",
                 ... }
                {"normalisedType": "addresslocality",
                 "type": "locality",
                 "format": "string",
                 "dbpedia": "http://../../Location",
                 "wikidata": "Q3257686",
                 "label_en": "locality",
                 "label_pt": "localidade",
                 ... }
                {"normalisedType": "twitter",
                 "type": "twitter",
                 "format": "string"
                 "dbpedia": "http://../../Twitter",
                 "wikidata": "Q918",
                 "language": "Multilingualism",
                 ...}
                ]
}
```

FIG. 5 (continued)

```
{
    "_id" : ObjectId("587e2d07e21b840001e408fa"),
    "uniqueUri" : "1dbf8412c250a40606995ab6500f947a",
    "entityIdentifiers" : [
        {
            "datasetUri" : "91.122.157.28:8080/filesystem/file_0032",
            "propertyValues" : [
                {
                    "propertyName" : "companyId",
                    "value" : [
                        "company_00001"
                    ]
                },
                {
                    "propertyName" : "corporateName",
                    "value" : [
                        "鳴門ゴルフ株式会社"
                    ]
                },
                {
                    "propertyName" : "corporateNumber",
                    "value" : [
                        "7480105076"
                    ]
                },
                {
                    "propertyName" : "edinetCode",
                    "value" : [
                        "E0456"
                    ]
                },
                {
                    "propertyName" : "securityCode",
                    "value" : [
                        "12340"
                    ]
                }
            ]
        }
    ]
}
```

FIG. 11

RECONCILED DATA STORAGE SYSTEM

CROSS-REFERENCE TO RELATED APPLICATIONS

This application claims the benefit of European Patent Application No. 17172285.3, filed May 22, 2017, in the European Intellectual Property Office, the disclosure of which is incorporated herein by reference.

BACKGROUND

1. Field

The embodiments are in the field of data storage and in particular relate to the recognition of input datasets.

2. Description of the Related Art

A challenge in the data science domain is the integration of input datasets from heterogeneous data sources with different structures, formats, and nature. Resolution of overlapping data and identification of data representing the same entity from different datasets require a high level of manual interaction. In most cases, knowing how to interpret an input dataset, or which information the data is related to, is a key element for a correct data interpretation and hence integration. In many cases, to integrate the input dataset properly it is necessary to have a background in the field of knowledge represented by the input dataset.

SUMMARY

Additional aspects and/or advantages will be set forth in part in the description which follows and, in part, will be apparent from the description, or may be learned by practice of the embodiments.

Information represented in input datasets takes an increasingly important role in the decision making of technological enterprises. Enabling machines to accurately describe datasets at varying levels of abstraction is desirable if the knowledge contained in input datasets is to be harvested.

The interoperability of machines is enhanced by storing datasets with accurate descriptors. Furthermore, the accessibility and efficiency of storage is enhanced with meaningfully annotated data.

Processing overheads are imposed in data centers by cross-device traversals and access operations.

It is desirable to enhance the ability of machines to recognize context and knowledge domains for input datasets. It is desirable to enhance the ability of machines to correctly and accurately reconcile data representing the same real-world entity from different heterogeneous data sources.

Embodiments include: a data storage system comprising a processor coupled to a memory, the memory including a reconciled data store and a registry, the processor being configured to execute a process comprising:

in the reconciled data store, storing, with respect to each of a plurality of registered entities: an array of registered entity property-value pairs representing the registered entity, from each dataset from among a plurality of (heterogeneous) datasets, wherein each of the registered entity data property-value pairs comprises a property label representing a property of a registered entity and a value representing a value range of the property for the respective registered entity;

in a registry, storing, with respect to each of the plurality of registered entities: a registry entry comprising at least one identifier property-value pair with respect to each of the plurality of datasets, wherein each of the identifier property-value pairs comprises an identifier property label representing an identifier property of a registered entity, uniquely identifying the registered entity (within the respective dataset), and an identifier value representing a value of the identifier property for the respective registered entity;

acquiring a dataset for reconciliation with the reconciled data store, the acquired dataset including a plurality of acquired dataset property-value pairs for each of a first set of one or more acquired dataset entities, wherein each of the acquired dataset data property-value pairs comprises a property label representing a property of an acquired dataset entity and a value representing a value range of the property for the respective acquired dataset entity.

The process further comprises, for each of the one or more acquired dataset entities:

identifying an identifier property-value pair stored in the registry matching an acquired dataset property-value pair for the acquired dataset entity; and consolidating the acquired dataset property-value pairs for the acquired dataset entity into the array of registered entity property-value pairs stored with respect to the registered entity identified by the identifier value of the identified identifier property-value pair.

Advantageously, the automated consolidation of data representing the same entity from different and heterogeneous data sources reduces considerably the manual intervention required in extract, transform, and load (ETL) tasks in the data science domain. Embodiments provide an intelligent system for automated acquisition and reconciliation of data providing the following benefits, among others:

Reducing considerably the effort in ETL tasks which are low value-added tasks.

The generation of machine readable metadata in semi-automatic and intelligent manner, especially with non-standard formats.

Facilitate the automation of data acquisition and reconciliation for assistants and intelligent platforms.

An identifier property uniquely identifies an entity. Uniqueness is among a population of entities to which the entity belongs, bound by the scope of data already acquired and stored in the system and to be acquired. For example, it may be unique among legal entities, or unique among entities listed at a particular list or registry.

Embodiments of another aspect include a data storage method, for stored including a reconciled data store and a registry, the method comprising: in the reconciled data store, storing, with respect to each of a plurality of registered entities: an array of registered entity property-value pairs representing the registered entity, from each dataset from among a plurality of datasets, wherein each of the registered entity data property-value pairs comprises a property label representing a property of a registered entity and a value representing a value range of the property for the respective registered entity. The method also includes: in the registry, storing, with respect to each of the plurality of registered entities: a registry entry comprising at least one identifier property-value pair with respect to each of the plurality of datasets, wherein each of the identifier property-value pairs comprises an identifier property label representing an identifier property of a registered entity, uniquely identifying the registered entity, and an identifier value representing a value of the identifier property for the respective registered entity. The method also includes: acquiring a dataset for reconciliation with the reconciled data store, the acquired dataset including a plurality of acquired dataset property-value pairs for each of a first set of one or more acquired dataset entities, wherein each of the acquired dataset data property-value pairs comprises a property label representing a property of an acquired dataset entity and a value representing a value range of the property for the respective acquired dataset entity. The method further comprises: for each of the one or more acquired dataset entities: identifying an identifier property-value pair stored in the registry matching an acquired dataset property-value pair for the acquired dataset entity; and consolidating the acquired dataset property-value pairs for the acquired dataset entity into the array of registered entity property-value pairs stored with respect to the registered entity identified by the identifier value of the identified identifier property-value pair.

Embodiments of another aspect include a computer program which, when executed by a computing apparatus, causes the computing apparatus to perform a method of an embodiment. Such a computer program may be stored on a computer-readable medium such as a non-transitory computer-readable medium.

BRIEF DESCRIPTION OF THE DRAWINGS

These and/or other aspects and advantages will become apparent and more readily appreciated from the following description of the embodiments, taken in conjunction with the accompanying drawings of which:

FIG. 11 illustrates a registry entry; and

DETAILED DESCRIPTION

Figure 1:
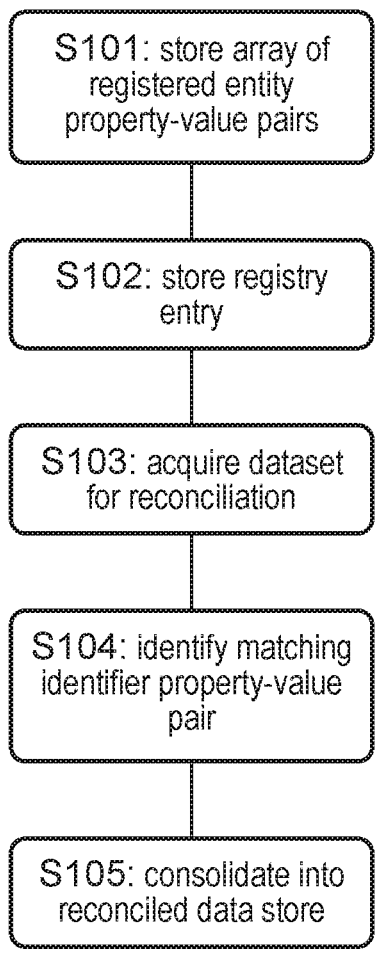
FIG. 1 illustrates an exemplary process executed by a data storage system.

Reference will now be made in detail to the embodiments, examples of which are illustrated in the accompanying drawings, wherein like reference numerals refer to the like elements throughout. The embodiments are described below by referring to the figures.

The data storage system 100 is a computing system and comprises memory hardware for storing data and processor hardware 101 for executing processing instructions. The processor hardware 101 is configured to perform the process illustrated in FIG. 1 by executing processing instructions stored on a memory 102 coupled to the processor hardware. The processor hardware 101 is referred to as a processor or the processor, and may be one or more CPU devices. The memory hardware is referred to as a memory or the memory, and comprises a storage device 102 accessible to the processor for storing processing instructions and for storing data for input to and output from the processor during execution of processing instructions. The memory hardware may also comprise a storage area for storing the registry 104, and a storage area for storing the reconciled data store 103. Each of said storage areas may comprise part or all of one or more interconnected storage devices.

At S101 of the process of FIG. 1, the reconciled data store 103 stores, for example, an array of registered entity property-value pairs representing the registered entity, from each dataset from among a plurality of heterogeneous datasets already input to the data storage system, wherein each of the registered entity data property-value pairs comprises a property label representing a property of a registered entity and a value representing a value range of the property for the respective registered entity. For example, the dataset may be read from its native storage as relational data, in which the entity is represented by a row of entries, the property label is a column header, and the value is the data from the entry of the row in the respective column. Alternatively, the dataset may be read from its native storage as graph data, in which, for example, property labels are labels of subject nodes linked to object nodes by a hasValue predicate, or equivalent, and the value is the value specified by the linked object node. The datasets may retain their respective native forms in the reconciled data store 103, albeit with modifications, such as removal or addition of property-value pairs, addition of reference ID, timestamps, and other metadata, and alignment of property labels with a set of defined property labels stored in the data storage system 100.

The reconciled data store 103 stores the sum of information about each registered entity from plural external (to the data storage system) physical data storage locations in one physical data storage area accessible via a single access point and in a consolidated form to avoid duplication of information.

At S102 of the process the registry 104 stores with respect to each of the plurality of registered entities: a registry entry comprising at least one identifier property-value pair with respect to each of the plurality of datasets, wherein each of the identifier property-value pairs comprises an identifier property label representing an identifier property of a registered entity, uniquely identifying the registered entity within the respective dataset, and an identifier value representing a value of the identifier property for the respective registered entity. Registered entity is taken to mean an entity appearing in the registry, that is, an entity for which an identifier property-value pair is identified among the input datasets and stored in a registry entry. Plural datasets store data relating to the same entity, and hence each entity has more than one corresponding identifier property-value pair. It is also possible that, for a single dataset, more than one identifier property-value pair is recorded in the registry entry for a single entity.

Identifier properties may be denoted as such by a system user (where system user is taken to be a manual input to the data storage system via, for example, a user interface) or by semantic analysis of the respective property label, or by a combination of the two. For example, automated semantic analysis of a property label may identify candidates for identifier properties, which candidates are presented to a system user for confirmation or rejection.

At step S103 a new dataset is acquired for reconciliation with the data already stored in the reconciled data store 103. The new dataset is acquired by reading data from its physical storage location (for example, addressed via a URL) and parsing the data into the data storage system. The acquired dataset includes a plurality of acquired dataset property-value pairs for each of a first set of one or more acquired dataset entities, wherein each of the acquired dataset data property-value pairs comprises a property label representing a property of an acquired dataset entity and a value representing a value range of the property for the respective acquired dataset entity.

For example, data acquisition may be performed by the processor 101 executing processing instructions stored on the memory 102 in order to read data via network interface hardware, the combination of processor 101, memory 102, and network interface hardware realizing an acquisition module. In addition to the acquisition module, systems may also be provided with a data property recognition module. Data property recognition may be performed by the processor 101 executing processing instructions stored on the memory 102, and making read accesses to a knowledge base or other data store via network interface hardware, the combination of processor 101, memory 102, and network interface hardware realizing a data property recognition module.

In systems provided without the acquisition module and the data property recognition module, it is assumed that input datasets, that is, datasets for reconciliation with the reconciled data store, are composed of values of recognized (i.e. labeled with property labels from a set stored by the data storage system 100) properties upon initiation of step S103, and the mapping of values to recognized properties is known. Thus, values in the input datasets are attributable to a property represented by a property label in a stored set or list of property labels. For example, the stored set or list of property labels may be stored as property-level nodes of a graph-based ontology model.

In systems provided with the acquisition module and the data property recognition module, input datasets, that is, datasets read into the system by the acquisition module from their native storage, are assigned a property label from the stored set of property labels for each property represented in the dataset. For each property the dataset contains a set of values each defining a value or range of values of the property. Wherein a set of values is, for example, a column of values in a tabular data set or a collection of values instantiating the same property-level concept in a data graph.

The acquisition module collects, extracts and integrates heterogeneous and distributed data into the system in the form of input datasets. The input datasets may be in different formats and contain different grades of information complexity.

The data property reconciliation module 220 normalizes the data with the purpose of providing the standardized data properties to the data storage system for identification of the entities represented in the data by the process of FIG. 1. The data property reconciliation module supports the process in order to provide datasets having values which are mapped to one of the property labels in the stored list. The data property reconciliation module assigns a property label from the stored list to a property represented by values within an input dataset. The data property reconciliation module receives raw data with their descriptors (i.e. native property labels) and, based on semantics of the descriptor and values of the property and knowledge, reconciles the descriptors with property labels from the stored list, a process which is described in more detail in German patent applications DE102016220781.4 & DE102016220771.7, the contents of which are incorporated herein by reference. The operation of the data property reconciliation module is to determine a data property descriptor from a list of standardized data property descriptors, or a new data property descriptor, to assign to a set of data values, and therefore, the functionality may be considered to be a recognition function, and the data property reconciliation module may be referred to as a data property recognition module.

Figure 3:
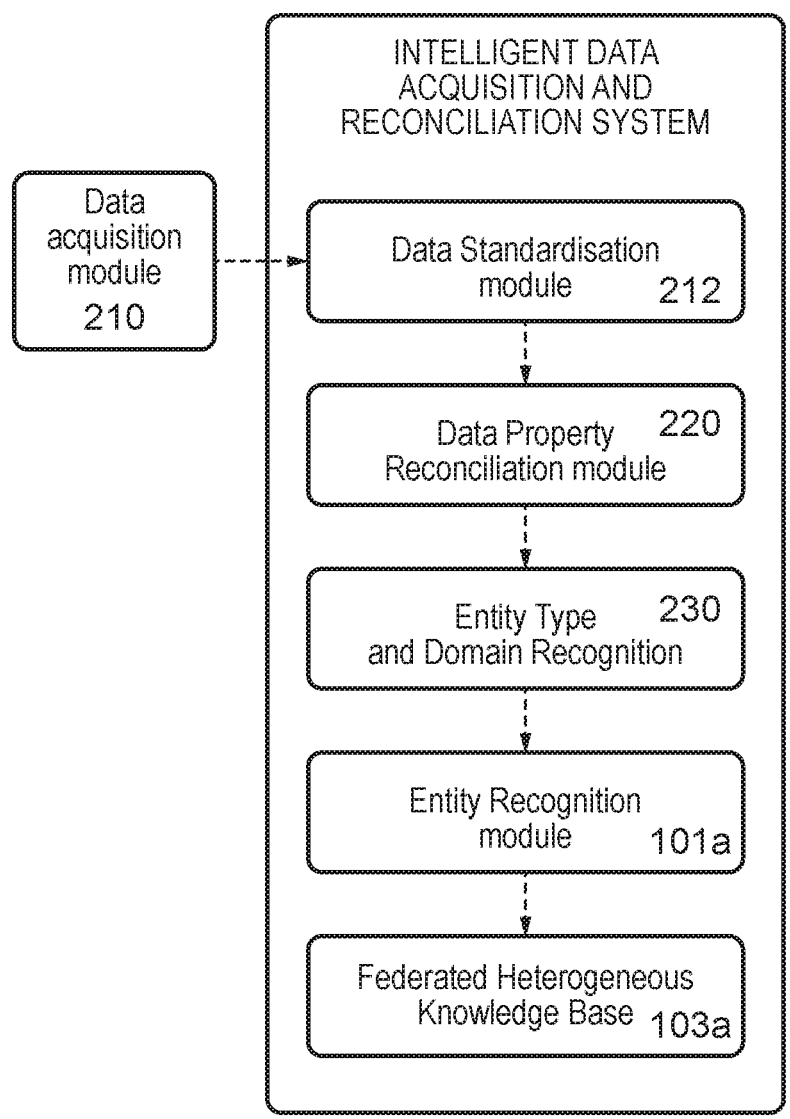
FIG. 3 illustrates an intelligent data acquisition and reconciliation system.
Figure 5:
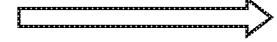
FIG. 5 illustrates a data property reconciliation process.

The principle of operation of the property recognition module 220 in the context of a wider data acquisition and reconciliation system is illustrated in FIG. 3. For example, raw data comprising a value of each of three properties for each of three entities is acquired as raw data by the property recognition module 220, as shown in FIG. 5. The properties are labeled with a descriptor. An exemplary data property recognition module 220 comprises a semantics engine which compares the semantics of descriptors labeling the properties in the raw data with the semantics of property labels from the stored list. The data property recognition module 220 comprises a data value fingerprint engine which compares statistical characteristics of the values of the properties in the raw data with the statistical characteristics of sets of values representing the property labels from the stored list. Based on the comparisons each set of values (i.e. each column) is assigned a property label from the stored list.

Whether the acquisition module 210 and the data property reconciliation module 220 are included in the system or are external modules providing data to the system, said modules may be provided by a data property recognition apparatus, data property recognition method, or data property recognition program such as that disclosed in German patent applications DE102016220781.4 & DE102016220771.7, the contents of which are incorporated herein by reference.

The process proceeds to S104, at which the acquired dataset property-value pairs in respect of an entity are used to identify the respective entity from among the registered entities. In particular, a case where the acquired dataset property-value pairs in respect of an entity do contain a property-value pair matching an identifier property-value pair stored in the registry. It may be that all of the acquired dataset property value pairs are compared against identifier property-value pairs to seek a matching property-value pair. Alternatively, it may be that a subset of the acquired dataset property-value pairs are selected for comparison, for example, based on a semantic comparison of the property label with property labels assumed to contain identifying values. Alternatively, it may be that both approaches are combined, with the subset compared with the identifier property-value pairs of the registry first, moving on to the remaining property-value pairs if no match is found. A match may be, for example, property label of the two pairs being equal and value of the two pairs being equal, or property label of the two pairs being equal and value of the two pairs being equal within a predefined tolerance, or property label of the two pairs being equal to a predefined tolerance and value of the two pairs being equal, or property label of the two pairs being equal to a predefined tolerance and value of the two pairs being equal to a predefined tolerance.

At step S105, the acquired dataset property-value pairs are consolidated into the reconciled data storage. For example, step S105 may comprise consolidating the acquired dataset property-value pairs for the acquired dataset entity into the array of registered entity property-value pairs stored with respect to the registered entity identified by the identifier value of the matching identifier property-value pair.

In particular, the consolidating may comprise, for each acquired-dataset property-value pair: if the property label matches a property label in the stored array of registered entity property-value pairs, if the value of the acquired dataset property-value pair matches the value of the registered entity property-value pair with the matching label, make no modification to the stored array, and if the value of the acquired dataset property-value pair does not match the value of the registered entity property-value pair, add the acquired dataset property-value pair to the stored array as a registered entity property-value pair; and if the property label does not match a property label in the stored array of registered entity property-value pairs, add the acquired dataset property-value pair to the stored array as a registered entity property-value pair.

The registry entry for the entry is extended with metadata representing the newly-added property-value pairs, including information identifying a storage location within the reconciled data store 103, one or more identifier property-value pairs, and a dataset ID uniquely identifying the acquired dataset among the plurality of datasets input to the system 100 and from which property-value pairs are stored in the reconciled data store 103.

Figure 4:
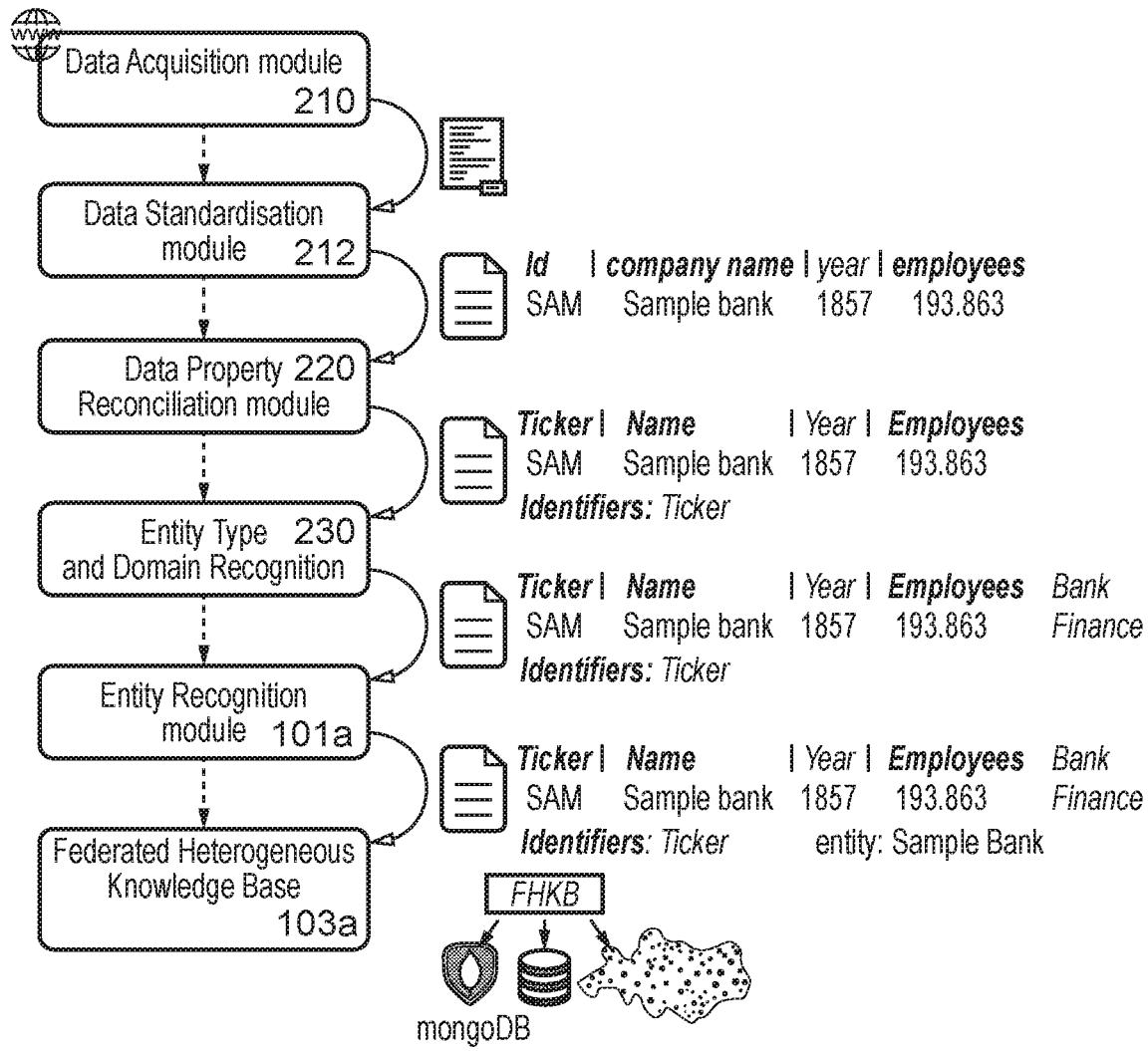
FIG. 4 illustrates the operation of the system of FIG. 3 with reference to a sample acquired dataset entity.

FIG. 3 illustrates components of the data storage system 100 in the wider context of an intelligent data acquisition and reconciliation system. FIG. 4 illustrates the operation of the system of FIG. 3 with reference to a sample acquired dataset entity.

Figure 2:
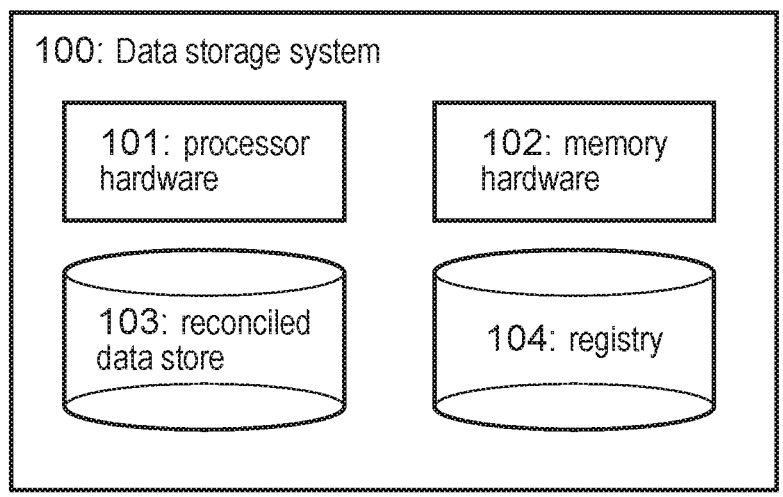
FIG. 2 illustrates exemplary hardware architecture.

The data storage system 100 of FIG. 2 may form part of the intelligent data acquisition and reconciliation system, a system which automates data ingestion tasks and recognizes and labels data properties, recognizes entity type and domains of entities represented in input datasets, and identifies entities within said datasets. In the same way as a speech recognition apparatus converts audio into a codified representation of speech, i.e. text, the intelligent data acquisition and reconciliation system converts heterogeneous datasets into reconciled and identified data within a single federated heterogeneous knowledge base 103a. The process of FIG. 1, which may be attributed to the entity recognition module 101a within the context of the FIG. 3 diagram, provides a key role within the understanding of input datasets by a machine, facilitated by the system of FIG. 3.

The data acquisition module 210 collects extracts and integrates heterogeneous and distributed data from respective native data sources into the system, and is described above in relation to step S103 of FIG. 1. These data sources could be in different formats and complexity of grades of information.

The data standardization module 212 obtains the data acquired by the data acquisition module 210 and processes the data to provide the correct format, that is, the standard format for the system. The data standardization module 212 modifies units of values and data formats upon parsing into the system for compliance with defined standards for the system. The data standardization module 212 normalizes the data with the purpose of providing a standardized format readable by the system. The data standardization module 212 supports the process in order to provide the right format to be recognized by the recognition and reconciliation modules. As illustrated in FIG. 4, the acquired data is parsed into acquired dataset property-value pairs.

The data property reconciliation module 220 module is configured to recognize the set of properties obtained through the data acquisition module 210 and data standardization module 212, and also, it is configured to store the set of standardized data properties to which input datasets are aligned, as well as recognizing which property-value pairs could be identifier property-value pairs. The data property reconciliation module 220 performs a reconciliation or recognition function, the reconciliation being alignment with a defined list or set of data properties. As illustrated in FIG. 4, the native property labels of the input dataset are modified to match property labels from a stored list of property labels. Semantics of the native property labels and the stored list of property labels are compared, along with statistical properties of the values, in order to match the property of the acquired dataset with a property from the stored list. In addition, the data property reconciliation module 220 recognizes which of the acquired dataset property-value pairs may be an identifier. For example, particular property labels among the stored list may be assumed by the system to represent identifiers. The module may execute semantic analysis of the respective property label. For example, automated semantic analysis of a property label may identify candidates for identifier properties, which candidates are presented to a system user for confirmation or rejection. The output of the data property reconciliation module is a clean and annotated version of the acquired dataset which contains the extracted data property-value pairs.

The entity type and domain recognition 230 is a procedure for categorizing the entities represented in an input dataset by two hierarchical levels of categorization, entity type, and domain. The system is able to infer added information from the set of data properties received and the potential identifiers based on knowledge. The entity type and domain recognition 230 may be automated, or partially automated & partially manual, using a knowledge base of user preferences and semantic and statistical properties of data to annotate or categories the entities represented in an input dataset with an entity type label and a domain label. In the same way as the property labels being from a defined list, the entity type and domain may also be from a defined list. It is noted in all cases that the lists may be partially predefined but may be augmented when new property labels, entity types, or domains are encountered. As illustrated by FIG. 4, the acquired dataset property-value pairs are annotated with new descriptors: an entity type descriptor and a domain descriptor.

The entity recognition module 101a is a representation of the process of FIG. 1, which results in acquired dataset property-value pairs being written into a reconciled data store, said reconciled data store being exemplified in FIG. 3 by the federated heterogeneous knowledge base 103a. The entity recognition module is configured to recognize the specific entity which acquired dataset property-value pairs refer to. The entity recognition module 101a obtains a set of standardized data properties, a set of potential identifiers, the potential type and domain of the entity from the entity type and domain recognition module 230, and, based on some or all of these inputs and knowledge stored in the registry 104 and reconciled data store 103, this module provides a recommendation about which specific entity property-value pairs in an input dataset refer to. As illustrated by FIG. 4, an entity known to the system and being represented by an entry in the registry 104 is determined to be the entity represented by the acquired dataset property-value pairs.

The federated heterogeneous knowledge base 103a is an intelligent data repository that offers a unified view of the knowledge about an entity from plural heterogeneous datasets. The federated heterogeneous knowledge base 103a provides a unified interface for all the data and knowledge stored into the system. Optionally, the federated heterogeneous knowledge base 103a component is able to decide and provide the best data repository depending on data nature. The federated heterogeneous knowledge base 103a offers a unified view of all of the data about a specific entity stored in the reconciled data store.

FIG. 5 exemplifies a sample input to and output from the data property reconciliation module 220. The output illustrates that, in addition to the property-value pair, metadata relating to the property label stored in association with the stored list of property labels is used to annotate the acquired dataset property-value pairs.

Figure 6:
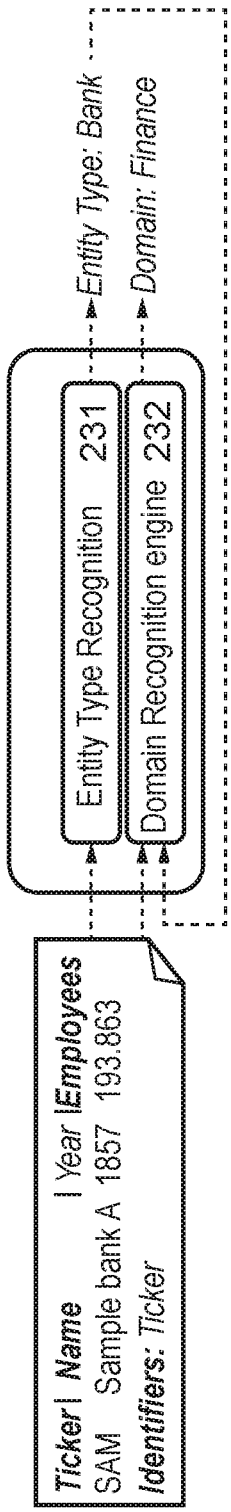
FIG. 6 illustrates an entity type and domain recognition process.

FIG. 6 exemplifies a sample input to and output from the entity type and domain recognition 230. The entity type and domain recognition module 230 is configured to provide an entity type and domain annotation to each acquired dataset entity based on knowledge stored in a knowledge base and user experience for the data properties received. This component extracts knowledge from ontologies and the preferences from the user feedbacks, and utilizes the knowledge to: recognize the entity type according to the data properties, and recognize the corresponding domain according to the entity type and the data properties. As illustrated in FIG. 6, the entity type recognition module 231 recognizes entity type, and the domain recognition module 232 recognizes domain.

The data acquisition module 210, data standardization module 212, data property reconciliation module 220, and entity type and domain recognition module 230 may be considered to perform pre-processing tasks for the process of FIG. 1 executed by the system of FIG. 2. A description of said modules is provided to explain the context for the process of FIG. 1 and system of FIG. 2. The process of FIG. 1 is executed on a hardware architecture such as that of FIG. 2. In the overview diagram of FIG. 3, the process of FIG. 1 is represented by the entity recognition module 101*a*.

The entity recognition module 101*a* identifies unique entities from the acquired dataset and matches or maps the unique entities to entities registered in the registry 104. The registry 104 is exemplified by the entity index registry of FIG. 7. The entity index registry 104 stores entity metadata in a registry entry per entity. Exemplary entity metadata includes a system identifier (i.e. an ID for the entity and all data relating thereto within the data storage system 100), an identifier of the dataset registry (a connected registry storing pointers to the physical location at which property-value pairs representing the entity are stored in the reconciled data store 103), and identifier property-value pairs of entity identifiers found in all the datasets processed by the system. To query the Entity Index Registry, a REST API provides different methods to obtain the information of this registry, e.g. to look for an entity with a given identifier property-value pair.

Figure 7:
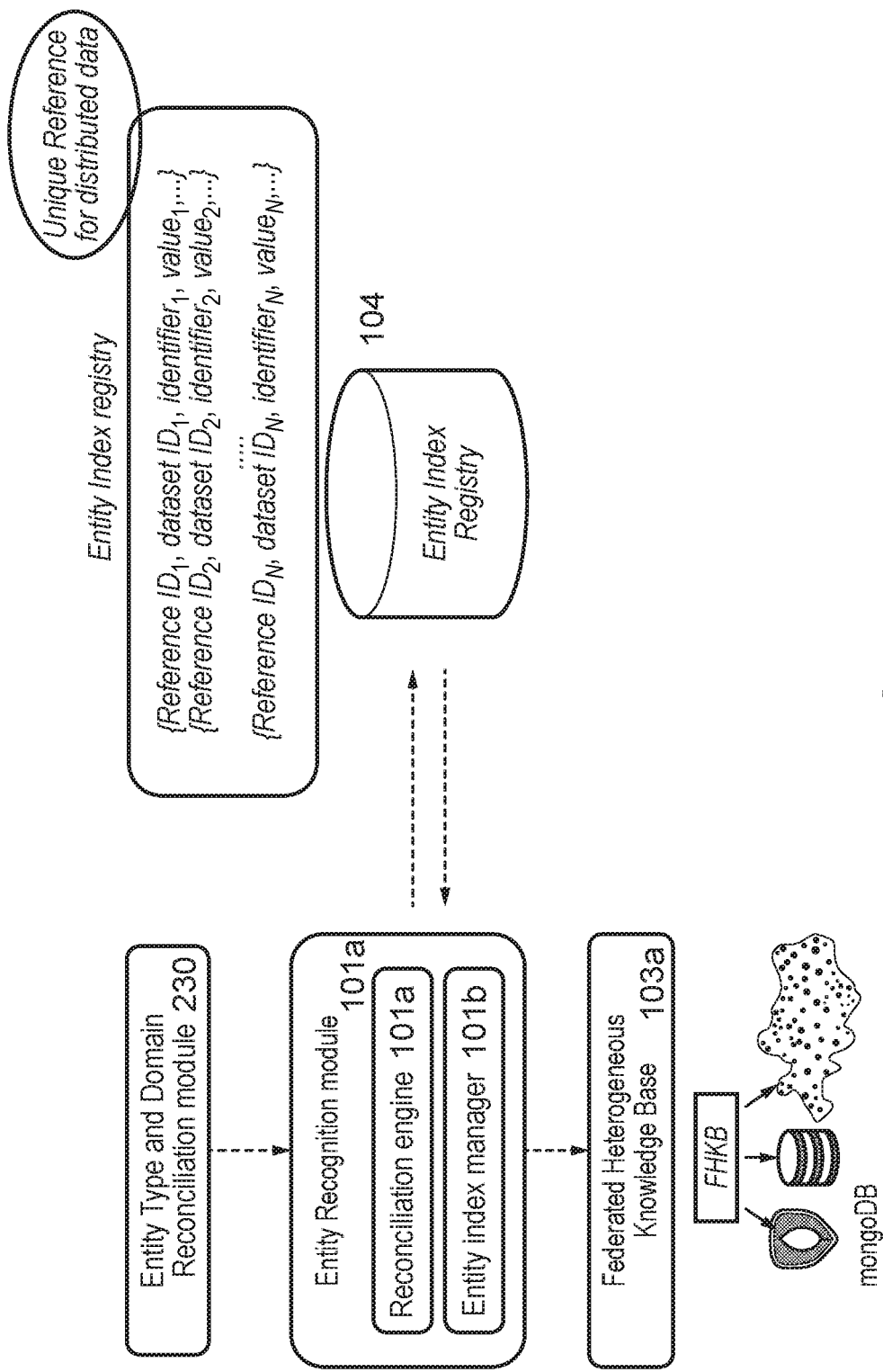
FIG. 7 illustrates an entity recognition process performed by the system of claim 1.

FIG. 7 illustrates in more detail the functionality provided by the entity recognition module 101*a*.

Figure 8:
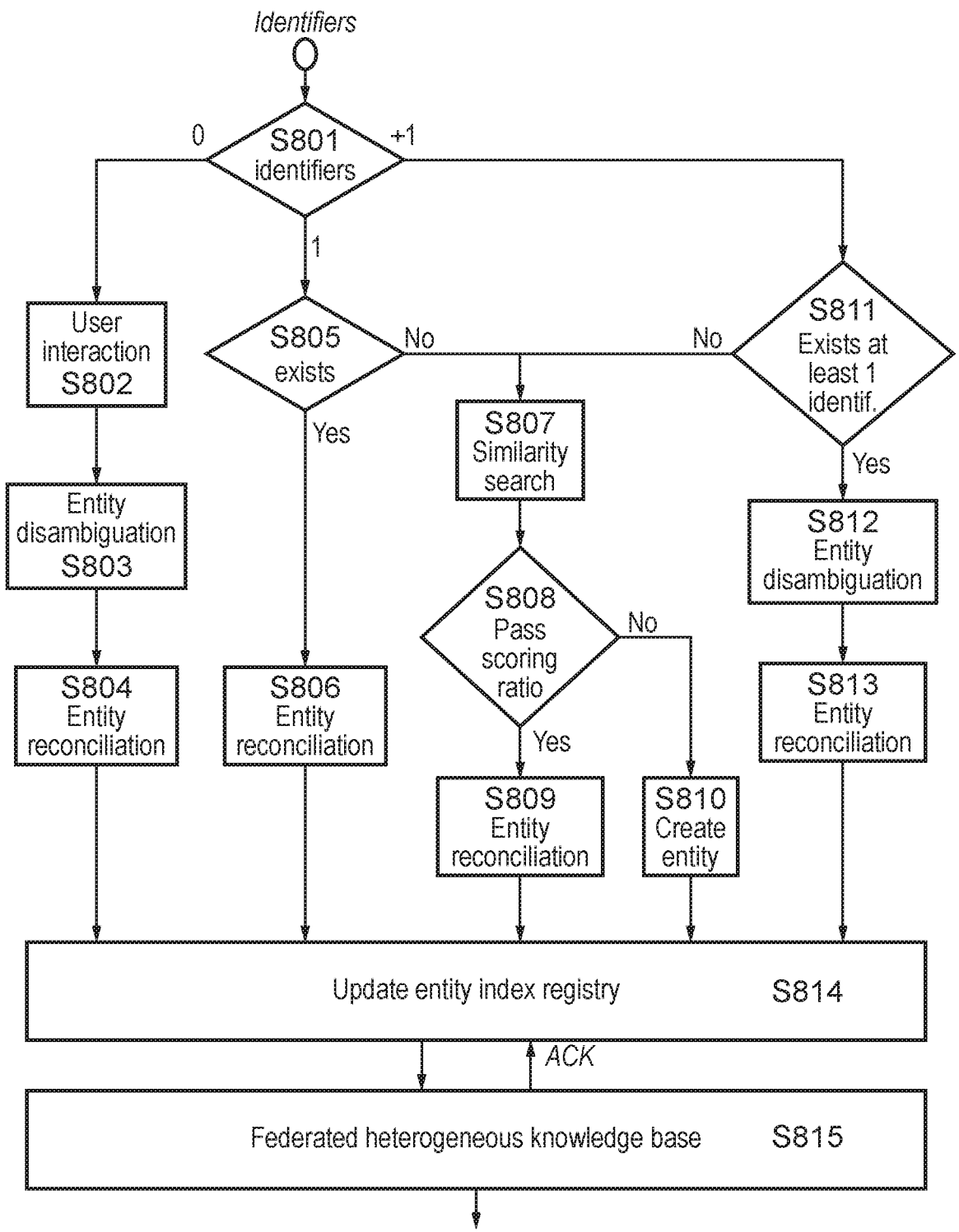
FIG. 8 illustrates an exemplary entity recognition process.

The entity recognition module 101*a* is configured to recognize the concrete entity to which acquired dataset property value pairs refer, from among registered entities. The entity recognition module 101*a* manages the entity index registry 104 and coordinates the use of said registry, and updates to said registry, given a received set of acquired dataset property-value pairs, and optionally the potential identifier property-value pair(s), and optionally also the entity type and domain annotations. To illustrate the functionality in more detail, the entity recognition module 101*a* of FIG. 7 is divided into two functional submodules: the reconciliation engine 1011 and the entity index manager 1012, as is further described in the followings paragraphs. Furthermore, for a better understanding of this module, a diagram of an exemplary process executed by the entity recognition module 101*a* is depicted in FIG. 8.

The processor 101 of FIG. 2 executes processing instructions stored on the coupled memory 102 in order to function as the entity recognition module 101*a*. FIG. 8 illustrates an exemplary entity reconciliation process performed by the entity recognition module 101*a*.

The process of steps S801 to S815 is performed on a per entity basis, so all of the steps relate a single entity represented in an acquired dataset. At step S801, a number of identifier property value pairs among the acquired dataset property-value pairs for the entity is determined. The determination may be based on rules stored by the system 100 regarding property labels attributed to identifier property-value pairs (i.e. properties for which the value uniquely identifies the entity). If there are no identifier property-value pairs in the acquired dataset property-value pairs representing the entity, the flow proceeds to S802. If there is a single identifier property-value pair, the flow proceeds to S805. At S805, it is determined whether or not the identifier property-value pair from the acquired dataset matches an identifier property-value pair stored in the registry 104. If it does, then the flow proceeds to S806. If it does not, then the flow proceeds to S807. If there is more than one identifier property-value pair among the acquired dataset property-value pairs representing the entity, the flow proceeds to S811. At S811 it is determined whether or not, from among the more than one identifier property-value pairs for the acquired dataset entity, there is at least one that matches an identifier property value pair stored in the registry 104. If there is, then the flow proceeds to S812, if there is not, then the flow proceeds to S807.

In the example of steps S801, S805, S807, and S811, the identifier property-values representing the acquired dataset entity are identified in advance. However, alternatively, all acquired dataset property-value pairs may be treated as having the potential to be identifiers, and thus compared with the identifier property-value pairs stored in the registry. If the comparisons determine there to be zero matches, then the flow proceeds to S807. If the comparisons determine there to be one match, then the flow proceeds to S806. If the comparisons determine there to be more than one match, but the matching identifier property-value pairs from the registry relate to the same entity, then the flow also proceeds to S806. If the comparisons determine there to be more than one match, and the matching identifier property-value pairs from the registry relate to different entities, then the flow proceeds to S812.

At S802, if the system cannot identify the presence of a property label presumed to be an identifier property label (based on stored logic such as a list of property labels presumed to be instantiated by identifying values) at S801, a dialog is established with the user via a user interface to recognize based on user insights one or more registered entities which the acquired dataset property-value pairs represent.

At S802, via a user interface, a system user is requested to either nominate one of the acquired dataset property-value pairs for the entity as an identifier property-value pair, or the user may nominate all of the property-value pairs as identifier property-value pairs. In either case, a comparison is performed between the identifier property-value pairs of the acquired dataset entity and the identifier property-value pairs of the registry. If the comparisons determine there to be zero matches, then the flow proceeds to S807. If the comparisons determine there to be one match, then the flow proceeds to S806. If the comparisons determine there to be more than one match, but the matching identifier property-value pairs from the registry relate to the same entity, then the flow also proceeds to S806. If the comparisons determine there to be more than one match, and the matching identifier property-value pairs from the registry relate to different entities, then the flow proceeds to S803, which is the same as S812.

At steps S803 and S812, an entity disambiguation process is executed. This process is to resolve ambiguity with respect to the entity identified by the identifier property-value pairs in the acquired dataset property-value pairs. The entity disambiguation process has as key inputs a set of identifier property-value pairs (in the case of having identifiers) and all the related information with the original data (set of data properties, values for the data properties, and optionally also one or more entity descriptors including entity type and domain). With that information the entity disambiguation component searches into the knowledge stored in the reconciled data store 103 to obtain the probability P., with an associated weight for each identifier related to a registered entity. Finally, the top ranked entity is returned as result of the following formula:

$$\text{entity disambiguation score} = \max \sum_{e=0}^{n} P_e W_e$$

The entity disambiguation process is a process to resolve ambiguity caused by the acquired dataset property-value pairs matching identifier property-value pairs of more than one different entity registry entry.

An exemplary entity disambiguation process may comprise, for each different registered entity identified by the identifier property-value pairs of the matching combinations: identifying, from among the array of registered entity property-value pairs stored in the reconciled data store with respect to the registered entity, a set of property labels matching property labels among the acquired dataset property-value pairs; and for each of the set of matching property labels, (string similarity distance or numeric distance) compare the respective values, and combine the results of the comparisons to obtain a distance measure between the acquired dataset entity and the registered entity; and selecting the registered entity for which the obtained distance measure to acquired dataset entity is the shortest as the reconciliation target for the acquired dataset entity.

Alternatively, at S802, the user may be presented with the option of the system 100 performing a similarity search process. If selected, the flow proceeds to S807.

At step S807 a similarity search process is performed. The similarity search process is to determine the most similar registered entity based on the data received from one or more among: data property and values, identifiers, entity type descriptor and domain descriptor. The similarity search process calculates a distance measure between the acquired dataset entity and each of the registered entities. In a first step of an exemplary similarity search process, the system 100 analyses the nature of the data and classifies the data based on the type of data, this is in order to determine a form of distance comparison for property-value pairs. Once the data is classified, the system determines the intersection between the property labels of the acquired dataset property-value pairs and those of the registered entity property-value pairs. Finally, the system 100 executes a distance calculation based on the values attributed to the intersecting property labels to calculate the similarity between the acquired dataset entity and the registered entity, obtaining as result an Euclidean distance among the properties which establish the intersection between the different entities.

$$\text{Similarity} = \sqrt[2]{dist(prop'_1, prop''_1)^2 + dist(prop'_2, prop''_2)^2 + \ldots + dist(prop'_w, prop''_n)^2)}$$

The different functions for calculate the distance between properties are based on string similarity and numeric distances calculated with state of the art techniques.

The similarity search process is not restricted to identifier property-value pairs of the registry, but compares the acquired dataset property-value pairs with the array of property-value pairs about registered entities stored in the reconciled data store 103. This may be considered a deep search based on all knowledge about an entity. An exemplary similarity search process comprises, for each of the registry entries in the register: identifying, from among the array of registered entity property-value pairs stored in the reconciled data store with respect to the registered entity identified by the registry entry, a set of property labels matching property labels among the acquired dataset property-value pairs; for each of the set of matching property labels, (string similarity distance or numeric distance) comparing the respective values, and combine the results of the comparisons to obtain a distance measure (such as an Euclidean distance as exemplified above) between the acquired dataset entity and the registered entity identified by the registry entry; and selecting the registered entity for which the obtained distance measure to the acquired dataset entity is the shortest as the most similar registered entity to the member of the second set.

At step S808, it is determined whether the obtained distance measure between the acquired dataset entity and the registered entity selected as the most similar registered entity to the member of the second set is above or below a defined threshold. The defined threshold is a global variable in the system, which may be predefined and adaptable by a system administrator. If it is determined that the obtained distance measure is below the threshold, then the flow proceeds to S809: consolidating the acquired dataset property-value pairs for the entity into the array of registered entity property-value pairs stored with respect to the most similar registered entity. If it is determined that the obtained distance measure is above the threshold, the flow proceeds to S810: including S815S815, adding the acquired dataset property-value pairs to the reconciled data store as registered entity property-value pairs with respect to the entity, and S814S814, creating a new entry in the register for the entity.

At steps S804, S806, S809, and S813, the acquired dataset property-value pairs are consolidated into the reconciled data store 103 for a reconciliation target entity. These steps determine how to reconcile the acquired dataset property-value pairs representing the target entity with the already stored property-value pairs representing the target entity (that is, registered entity property-value pairs). For this purpose, the system 100 determines the overlap between the already stored property-value pairs and the acquired dataset property-value pairs. For the case of non-overlapping data, the acquired dataset property-value pairs are written to the reconciled data store 103 as registered entity property-value pairs for the target entity. For the overlapping data, an exemplary procedure is to determined a confidence score for the acquired dataset and a confidence score for the dataset from which the overlapping registered entity property-value pair was obtained, and to select the property-value pair with the higher confidence score to be stored in the reconciled data store 103. For example, the confidence score may be based on the confidence of the system user in the dataset, and/or the number of times which a new data property-value pair refers to each entity. These confidence scores may be stored into the knowledge base as annotations.

An example of the consolidation is as follows: for each acquired-dataset property-value pair: if the property label matches a property label in the stored array of registered entity property-value pairs, if the value of the acquired dataset property-value pair matches the value of the registered entity property-value pair with the matching label, make no modification to the stored array, and if the value of the acquired dataset property-value pair does not match the value of the registered entity property-value pair, add the acquired dataset property-value pair to the stored array as a registered entity property-value pair S814; and if the property label does not match a property label in the stored array of registered entity property-value pairs, add the acquired dataset property-value pair to the stored array as a registered entity property-value pair S814. At S813 any identifier property-value pairs from the acquired dataset property-value pairs are added to the respective registry entry.

Figure 9:
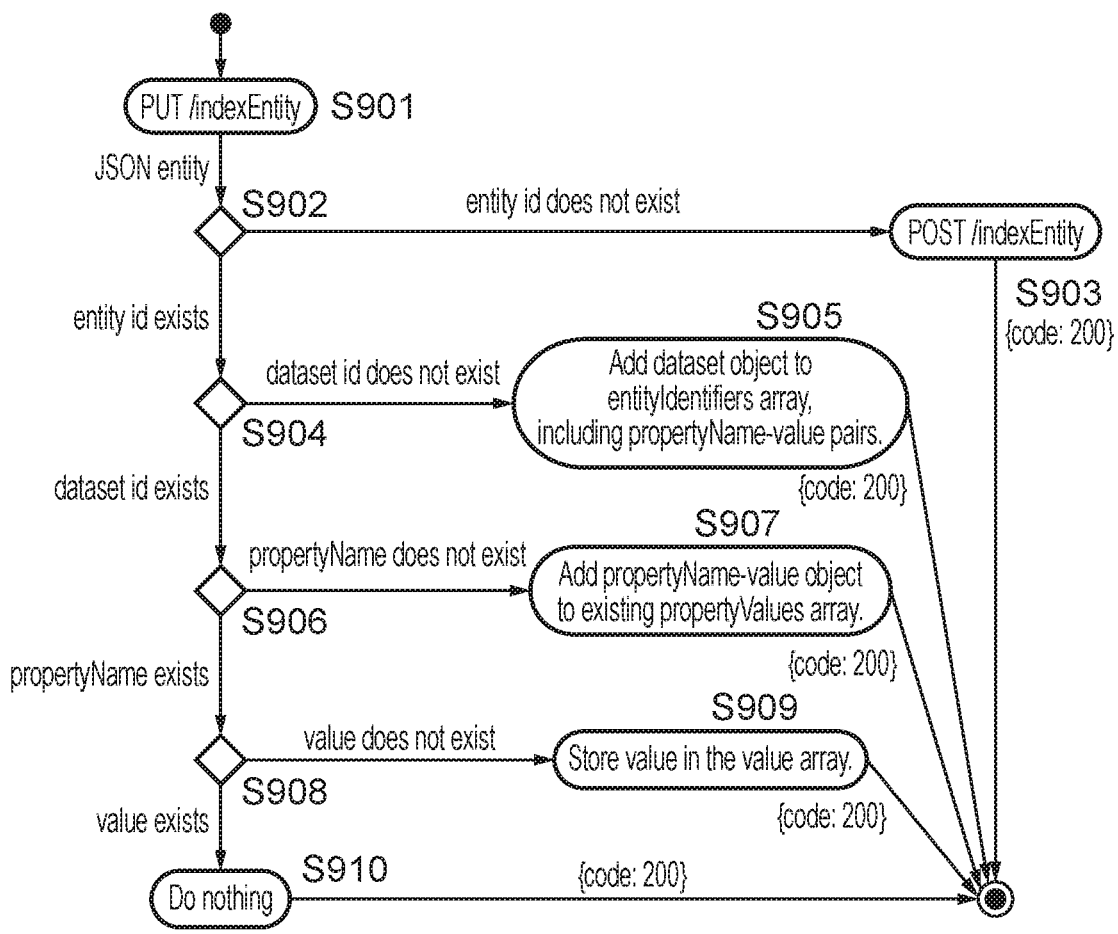
FIG. 9 illustrates an entity index registry management process.

The entity index manager 1012 is configured to manage the all the CRUD (Create, Read, Update and Delete operations) requests in the entity index registry 104. FIG. 9 illustrates an exemplary logic followed by the entity index manager 1012.

At S901 the reconciliation engine 1011 issues a put request to the entity index manager 1012 specifying the entity from among the acquired dataset entities. The entity is parsed by the entity index manager 1012 as a JSON entity.

At S902, it is determined whether the entity, that is, the property-value pairs from the acquired dataset contained within the JSON entity, are being added to the reconciled data store 103 as a new entity (e.g. as part of or following step S810 of FIG. 8) or being consolidated with the array of property-value pairs already stored in the reconciled data store 103 for a registered entity (e.g. as part of steps S804, S806, S809, and S813 of FIG. 8). In the case of the former, the flow proceeds to S903, in the case of the latter, the flow proceeds to S904.

At S903 a POST operation is performed and a registry entry for the entity is created in the entity index registry 104. The entry comprises a system ID or reference number uniquely identifying the entity among the registered entities in the system, along with identifier property value pairs from among the acquire dataset property-value pairs representing the entity. In addition, metadata for the dataset, such as a dataset ID or URL, may be included in the registry entry. The acquired-dataset property-value pairs representing the entity are added to the reconciled data store 103 as registered entity property-value pairs.

At S904 it is determined whether identifier property-value pairs from the dataset have already been added to the registry entry, based on a dataset identifier. If it is determined that identifier property-value pairs from the dataset have already been added to the registry entry, the flow proceeds to S906. If not, the flow proceeds to S905.

At S905, a dataset object is added to the registry entry, including the identifier property-value pairs from the acquired dataset for the entity. The remaining acquired dataset property-value pairs for the entity are added to the array of registered entity property-value pairs for the entity in the reconciled data store 103. This adding may be all property-value pairs, or may omit acquired dataset property-value pairs which match an existing registered entity property-value pair for the same entity.

At S906 it is determined, for each acquired dataset property-value pair, whether or not the property label already exists among the array of registered entity property-value pairs for the entity. If it is determined that the property label does not already exist among said array, the flow proceeds to S907. If it is determined that the property label does already exist among said array, the flow proceeds to S908.

At S907, the acquired dataset property-value pair is added to the array of registered dataset property-value pairs for the entity.

At S908, it is determined whether the value matches the or any of the values already present in the array of registered entity property-value pairs for the matching property label. If the value does match, then the flow proceeds to S910. If the value does not match, then the flow proceeds to S909.

At S909, the acquired dataset property-value pair is added to the array of registered dataset property-value pairs for the entity.

At S910, the acquired dataset property value pair is discarded with no modification to the entity index registry or the array of registered entity property-value pairs.

It is noted that the procedure may omit steps S904 and S905, so that a positive determination at step S902 leads directly to step S906.

Figure 10:
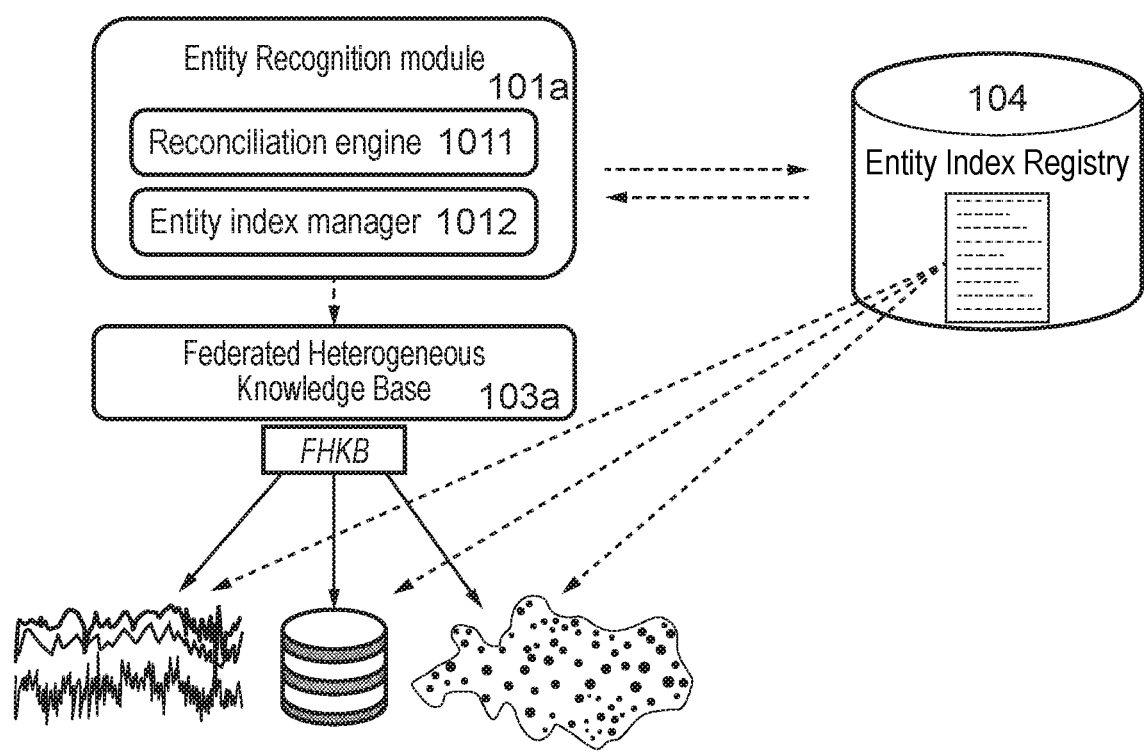
FIG. 10 illustrates an entity index registry.

The entity index registry 104 is illustrated in FIG. 10. The entity index registry 104 is a data storage device or a memory area within a data storage device, and stores information including a reference index with metadata of all the entities stored by the system. This registry enables the possibility of storing distributed entities in several different data stores. For example, the registry 104 stores an index with the following parameters related to each entity in an entry for the entity: unique system id, pairs of identifier property-value, data store reference or dataset reference, and other parameters as illustrated in FIG. 11, such as address at which the dataset may be accessed in the reconciled data store 103.

FIG. 11 illustrates an exemplary registry entry, which registry entry is illustrated within the entity index registry 104 in FIG. 10.

The entity index registry 104 provides a centralized index with all the entities stored in the system 100. Furthermore, the inclusion of at least one identifier property-value pair and a dataset ID for each dataset comprising property-value pairs for the entity enables the entities in each data store in which the entity has a portion of the information to be identified, as well as, the identifiers which this distributed information may be located. Finally, the entity index registry 104 stores other additional information that may provide some extra information, such as, timestamp of the last update or other metadata, as is illustrated in FIG. 11.

The Federated Heterogeneous Knowledge base 103a is exemplary of the reconciled data store and is an intelligent data repository that offers a unified view of the knowledge present in the system 100. The array of registered entity property-value pairs for each entity is stored in the federated heterogeneous knowledge base 103a. The knowledge base 103a may store datasets in their native format and thus may use a variety of data repositories internally, as for example document stores (e.g. MongoDB), graph databases (e.g. Neo4j), or in-memory data (Spark RDDs). Each one of these data repositories may be located in a different computer or in several of them (a cluster) when possible. The heterogeneous knowledge base is able to store and update the data in the internal data repositories, choosing the most appropriate place or places (with possible replication) for each data fragment. The Federated Heterogeneous Knowledge base 103a is also configured to provide an interface to handle data query operations on the knowledge base and to respond to queries on the stored data, by:

Expanding the query using the knowledge available in the system to identify all the data that is relevant to answer the query.

Locating the relevant pieces of data in their corresponding data stores that are relevant for the corresponding query.

Leveraging the different data stores for query optimization depending on the requirements of the queries and the capabilities of the data stores.

Integrating the partial answers obtained from each of these data stores into a unified answer as would have been obtained from a single data store.

Figure 12:
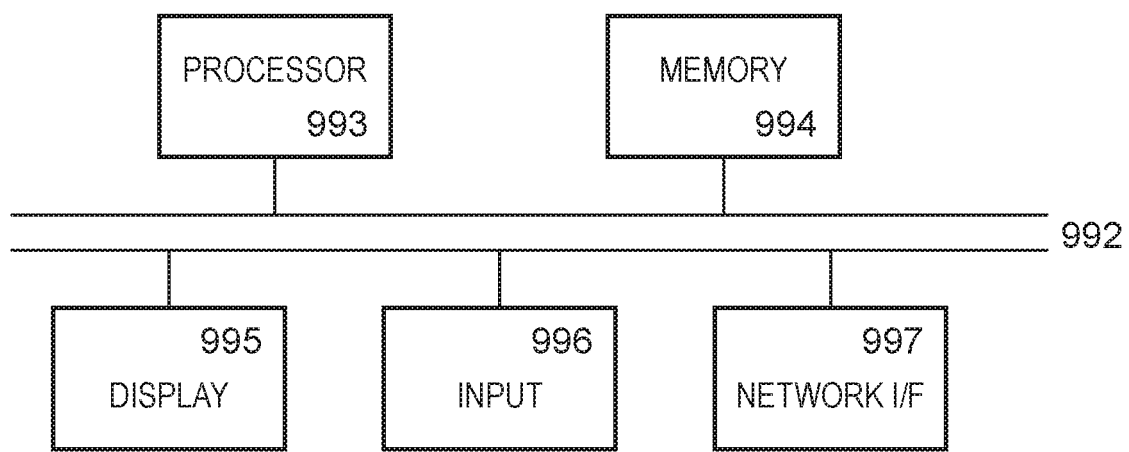
FIG. 12 illustrates a hardware structure of a computing device in the data storage system of FIG. 1.

FIG. 12 is a block diagram of a computing device, such as a data storage server forming all or part of a data storage system 100, and which may be used to implement a method of an embodiment of FIG. 1. The computing device comprises a processor 993, and memory, 994. Optionally, the computing device also includes a network interface 997 for communication with other computing devices, for example with other computing devices of embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of the entity recognition module 101a, the entity index registry 104, the entity type and domain recognition module 230, the data acquisition module 210, the data standardization module 212, and the data property reconciliation module 220, described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The data storage system 100 of FIGS. 2, 3, 4, 7, and 10, may be a processor 993 (or plurality thereof) executing processing instructions (a program) stored on a memory 994 and acquiring data via a network I/F 997. In particular, the processor 993 executes processing instructions to receive, via the network I/F, acquired dataset property-value pairs from native data stores and reconcile the data into the reconciled data store, as in the method of FIG. 1. Furthermore, the processor 993 may execute processing instructions to store reconciled data on a connected storage unit and/or to transmit, via the network I/F 997, reconciled data to a federated heterogeneous knowledge base 103a for storage.

The entity recognition module 101a of FIGS. 2, 3, 4, 7, and 10, may be a processor 993 (or plurality thereof) executing processing instructions (a program) stored on a memory 994 and acquiring data via a network I/F 997 and/or via a data acquisition module 210. In particular, the processor 993 executes processing instructions to receive, via the network I/F, acquired dataset property-value pairs from native data stores and reconcile the data into the reconciled data store, as in the method of FIG. 1. Furthermore, the processor 993 may execute processing instructions to store reconciled data on a connected storage unit and/or to transmit, via the network I/F 997, reconciled data to a federated heterogeneous knowledge base 103a for storage.

The entity index registry 104 of FIGS. 2, 7, and 10, and the manager thereof, may be a processor 993 (or plurality thereof) executing processing instructions (a program) stored on a memory 994 and exchanging data via a network I/F 997 or via an internal data exchange mechanism. In particular, the processor 993 executes processing instructions to receive, via the network I/F or internal data exchange mechanism, acquired dataset property-value pairs representing an entity from the entity recognition module 101a and to consolidate the received data into the reconciled data store 103, as in step S104 of FIG. 1, or as in the method of FIG. 9. Furthermore, the processor 993 may execute processing instructions to store acquired dataset property-value pairs on a connected storage unit such as the entity index registry 104 or the reconciled data store 103.

The entity type recognition module 230 of FIGS. 3, 4, 6, & 7, may be a processor 993 (or plurality thereof) executing processing instructions (a program) stored on a memory 994 and exchanging data via a network I/F 997. In particular, the processor 993 executes processing instructions to receive a set of data properties characterizing an acquired dataset from either a data property recognition module 220 or some other input mechanism, and process the set of data properties to generate a selection of an entity type for the input dataset as illustrated in FIG. 6. Furthermore, the processor 993 may execute processing instructions to store the selected entity type with the acquired dataset on a connected storage unit and/or to transmit, via the network I/F 997, the entity type selection to the domain recognition module 230 for use in selecting a domain for the input dataset.

The domain recognition module 230 of FIGS. 3, 4, 6, & 7, may be a processor 993 (or plurality thereof) executing processing instructions (a program) stored on a memory 994 and exchanging data via a network I/F 997. In particular, the processor 993 executes processing instructions to receive a set of data properties characterizing an acquired dataset from either a data property recognition module 220 or some other input mechanism, and a selection of entity type for the input dataset from the entity type recognition module 230 and process the set of data properties and the selection of entity type to generate a selection of a domain for the input dataset. Furthermore, the processor 993 may execute processing instructions to store the selected domain with the acquired dataset on a connected storage unit and/or to transmit, via the network I/F 997, the entity type selection, the domain selection, and the set of data properties to the entity recognition module 101a.

The data acquisition module of FIGS. 3 & 4 may be a processor 993 (or plurality thereof) executing processing instructions (a program) stored on a memory 994 and exchanging data via a network I/F 997. In particular, the processor 993 executes processing instructions to receive, via the network I/F, acquired dataset property value pairs from their respective native data sources and to parse the acquired data into the system 100. Furthermore, the processor 993 may execute processing instructions to store the acquired dataset on a connected storage unit and/or to transmit, via the network I/F 997, the acquired dataset to the data property reconciliation module 220 (also referred to as the data property recognition module 220) for processing, and optionally via the data standardization module.

The data standardization module 212 of FIGS. 3 & 4 may be a processor 993 (or plurality thereof) executing processing instructions (a program) stored on a memory 994 and exchanging data via a network I/F 997. In particular, the processor 993 executes processing instructions to receive, via the network I/F, an acquired dataset from the data acquisition module 210 and standardize the data into the data format and units defined as standard for the system 100. Furthermore, the processor 993 may execute processing instructions to store the standardized acquired dataset on a connected storage unit and/or to transmit, via the network I/F 997, the standardized acquired dataset to the data property reconciliation module for processing.

The data property reconciliation module of FIGS. 3 & 4 may be a processor 993 (or plurality thereof) executing processing instructions (a program) stored on a memory 994 and exchanging data via a network I/F 997. In particular, the processor 993 executes processing instructions to receive, via the network I/F, an acquired dataset from the dataset acquisition module 210 and reconcile the property labels with those in a stored list. Furthermore, the processor 993 may execute processing instructions to store the acquired dataset with property labels modified to match those of the stored list on a connected storage unit and/or to transmit, via the network I/F 997, said acquired dataset to the entity recognition module 101a for processing, optionally via the entity type and domain recognition module 230.

Methods embodiments may be carried out on a computing device such as that illustrated in FIG. 12 using a non-transitory computer readable storage medium. Such a computing device need not have every component illustrated in FIG. 12, and may be composed of a subset of those components. A method of the embodiments may be carried out by a single computing device in communication with one or more data storage servers via a network. The computing device may be a data storage itself storing the reconciled data store 103 and the registry 104.

A method embodying the present invention may be carried out by a plurality of computing devices operating in cooperation with one another. One or more of the plurality of computing devices may be a data storage server storing at least a portion of the reconciled data store 103 and the registry 104.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A data storage system comprising:
 a memory including a reconciled data store and a registry; and
 a processor, coupled to the memory, configured to execute a process including
  in the reconciled data store, storing, with respect to each of a plurality of registered entities:
  an array of registered entity property-value pairs representing a registered entity, from each dataset from among a plurality of datasets, wherein each of the registered entity data property-value pairs includes a property label representing a property of a registered entity and a value representing a value range of the property for a respective registered entity;
  in a registry, storing, with respect to each of the plurality of registered entities: a registry entry including a plurality of identifier property-value pairs for the registered entity, including at least one identifier property-value pair with respect to each of the plurality of datasets in which the registered entity appears, wherein each of the identifier property-value pairs is stored along with a dataset identifier for the respective dataset, and includes an identifier property label representing an identifier property of the registered entity, the identifier property being a property for which values uniquely identify entities in the respective dataset, and an identifier value representing the value of the identifier property for the respective registered entity and uniquely identifying the registered entity in the respective dataset;
  acquiring a dataset for reconciliation with the reconciled data store, an acquired dataset including a plurality of acquired dataset property-value pairs for each of a first set of one or more acquired dataset entities, wherein each of the acquired dataset data property-value pairs includes a dataset property label representing a property of an acquired dataset entity and a dataset value representing the value range of the property for a respective acquired dataset entity; and for each of the one or more acquired dataset entities:
identifying an identifier property-value pair stored in the registry matching an acquired dataset property-value pair for the acquired dataset entity; and
consolidating acquired dataset property-value pairs for the acquired dataset entity into the array of registered entity property-value pairs stored with respect to the registered entity identified by the identifier value of the identified identifier property-value pair.

2. The system according to claim 1,
wherein the acquired dataset further includes a plurality of acquired dataset property-value pairs for each member of a second set of one or more acquired dataset entities, from among which plurality of acquired dataset property-value pairs for each member of the second set there is no matching identifier property-value pair stored in the registry;
the process further comprising, for each member of said second set, performing a similarity search process comprising: for each of the registry entries in a register:
identifying, from among the array of registered entity property-value pairs stored in a reconciled data store with respect to the registered entity identified by the registry entry, a set of property labels matching property labels among the acquired dataset property-value pairs;
for each set of matching property labels, comparing the respective values, and combining results of comparisons to obtain a distance measure between a member of the second set and the registered entity identified by the registry entry; and
selecting the registered entity for which an obtained distance measure to the member of the second set is a shortest as a most similar registered entity to the member of the second set.

3. The system according to claim 2, wherein the process further comprises:
determining whether the obtained distance measure between the member of the second set and the registered entity selected as the most similar registered entity to the member of the second set is above or below a threshold; and
when it is determined that the obtained distance measure is below the threshold, consolidating the acquired dataset property-value pairs for the member of the second set into the array of registered entity property-value pairs stored with respect to the most similar registered entity; and
when it is determined that the obtained distance measure is above the threshold, adding the acquired dataset property-value pairs to the reconciled data store as registered entity property-value pairs with respect to the member of the second set, and creating a new entry in the register for the member of the second set.

4. The system according to claim 3, wherein the process further comprises:
presenting one or more acquired dataset property-value pairs for the member of the second set to a system user via a user interface, and presenting one or more registered entity property-value pairs for the most similar registered entity to the system user via the user interface;
receiving, from the system user, an indication of whether the presented acquired dataset property-value pairs represent the same entity as the presented registered entity property-value pairs; and
in a case of the received indication being positive, consolidating the acquired dataset property-value pairs for the member of the second set into the array of registered entity property-value pairs stored with respect to the most similar registered entity; and
in the case of the received indication being negative, adding the acquired dataset property-value pairs to the reconciled data store as registered entity property-value pairs with respect to the member of the second set, and creating the new entry in the register for the member of the second set.

5. The system according to claim 1, wherein
the registry entry further comprises a system entity ID uniquely identifying the registered entity within the system, and
the array of registered entity property-value pairs are stored in association with the system entity ID.

6. The system according to claim 1, wherein the property labels of the registered entity property-value pairs, and the property labels of the acquired dataset property-value pairs, are from a set of standardized property labels stored by the system.

7. The system according to claim 1, wherein consolidating the acquired dataset property-value pairs for the acquired dataset entity into the array of registered entity property-value pairs stored with respect to the registered entity identified by the identifier value of the identified identifier property-value pair includes: for each acquired-dataset property-value pair:
when the property label matches an array property label in the stored array of registered entity property-value pairs, when the value of the acquired dataset property-value pair matches the value of the registered entity property-value pair with the matching label, make no modification to the stored array, and when the value of the acquired dataset property-value pair does not match the value of the registered entity property-value pair, adding the acquired dataset property-value pair to the stored array as a registered entity property-value pair; and
when the property label does not match a property label in the stored array of registered entity property-value pairs, adding the acquired dataset property-value pair to the stored array as a registered entity property-value pair.

8. The system according to claim 2, the process including for each of the one or more acquired dataset entities:
for every combination of acquired dataset property-value pair for the acquired dataset entity and identifier property-value pair in the registry, determining whether the respective properties are matching and the respective values are matching;
when the number of determined matching combinations is zero, executing the similarity search process of claim 2;
when the number of determined matching combinations is one, or when the number of determined matching combinations is greater than one and the number of different registered entities identified by the identifier property-value pairs of the matching combinations collectively is one, consolidating the acquired dataset property-value pairs for the acquired dataset entity into the array of registered entity property-value pairs stored with respect to the registered entity identified by the identifier value of the identifier property-value pair from the matching combination; and when the number of determined matching combinations is greater than one, and the number of different registered entities identified by the identifier property-value pairs of the matching combinations collectively is greater than one, executing an entity disambiguation process including, for each different registered entity identified by the identifier property-value pairs of the matching combinations:

identifying, from among the array of registered entity property-value pairs stored in the reconciled data store with respect to the registered entity, a set of property labels matching property labels among the acquired dataset property-value pairs;

for each of the set of matching property labels, string similarity distance or numeric distance, comparing the respective values, and combining the results of the comparisons to obtain a distance measure between the acquired dataset entity and the registered entity;

selecting the registered entity for which the obtained distance measure to acquired dataset entity is a shortest as a reconciliation target for the acquired dataset entity; and consolidating the acquired dataset property-value pairs for the acquired dataset entity into the array of registered entity property-value pairs stored with respect to the reconciliation target.

9. A data storage method, for stored data including a reconciled data store and a registry, the method comprising:

in the reconciled data store, storing, with respect to each of a plurality of registered entities: an array of registered entity property-value pairs representing a registered entity, from each dataset from among a plurality of datasets, wherein each of the registered entity data property-value pairs includes a property label representing a property of a registered entity and a value representing a value range of the property for a respective registered entity;

in the registry, storing, with respect to each of the plurality of registered entities: a registry entry having a plurality of identifier property-value pairs for the registered entity, including at least one identifier property-value pair with respect to each of the plurality of datasets in which the registered entity appears, wherein each of the identifier property-value pairs is stored along with a dataset identifier for the respective dataset, and includes an identifier property label representing an identifier property of a registered entity, the identifier property being a property for which values uniquely identify entities in the respective dataset, and an identifier value representing a value of the identifier property for the respective registered entity and uniquely identifying the registered entity in the respective dataset;

acquiring a dataset for reconciliation with the reconciled data store, the acquired dataset including a plurality of acquired dataset property-value pairs for each of a first set of one or more acquired dataset entities, wherein each of the acquired dataset data property-value pairs includes a dataset property label representing a property of an acquired dataset entity and a dataset value representing a value range of the property for the respective acquired dataset entity; and for each of the one or more acquired dataset entities:
identifying an identifier property-value pair stored in the registry matching an acquired dataset property-value pair for the acquired dataset entity; and consolidating the acquired dataset property-value pairs for the acquired dataset entity into the array of registered entity property-value pairs stored with respect to the registered entity identified by the identifier value of the identified identifier property-value pair.

10. A non-transitory computer-readable medium for controlling a computer and storing a computer program which, when executed by a computing apparatus, causes the computing apparatus to perform a method comprising:

in the reconciled data store, storing, with respect to each of a plurality of registered entities, an array of registered entity property-value pairs representing a registered entity, from each dataset from among a plurality of datasets, wherein each of the registered entity data property-value pairs includes a property label representing a property of a registered entity and a value representing a value range of the property for a respective registered entity;

in the registry, storing, with respect to each of the plurality of registered entities, a registry entry having a plurality of identifier property-value pairs for the registered entity, including at least one identifier property-value pair with respect to each of the plurality of datasets in which the registered entity appears, wherein each of the identifier property-value pairs is stored along with a dataset identifier for the respective dataset, and includes an identifier property label representing an identifier property of a registered entity, the identifier property being a property for which values uniquely identifying the registered entity, and an identifier value representing a value of the identifier property for the respective registered entity and uniquely identifying the registered entity in the respective dataset;

acquiring a dataset for reconciliation with the reconciled data store, the acquired dataset including a plurality of acquired dataset property-value pairs for each of a first set of one or more acquired dataset entities, wherein each of the acquired dataset data property-value pairs includes a dataset property label representing a property of an acquired dataset entity and a value representing a value range of the property for the respective acquired dataset entity; and for each of the one or more acquired dataset entities:
identifying an identifier property-value pair stored in the registry matching an acquired dataset property-value pair for the acquired dataset entity; and consolidating the acquired dataset property-value pairs for the acquired dataset entity into the array of registered entity property-value pairs stored with respect to the registered entity identified by the identifier value of the identified identifier property-value pair.

* * * * *